Figure 1:
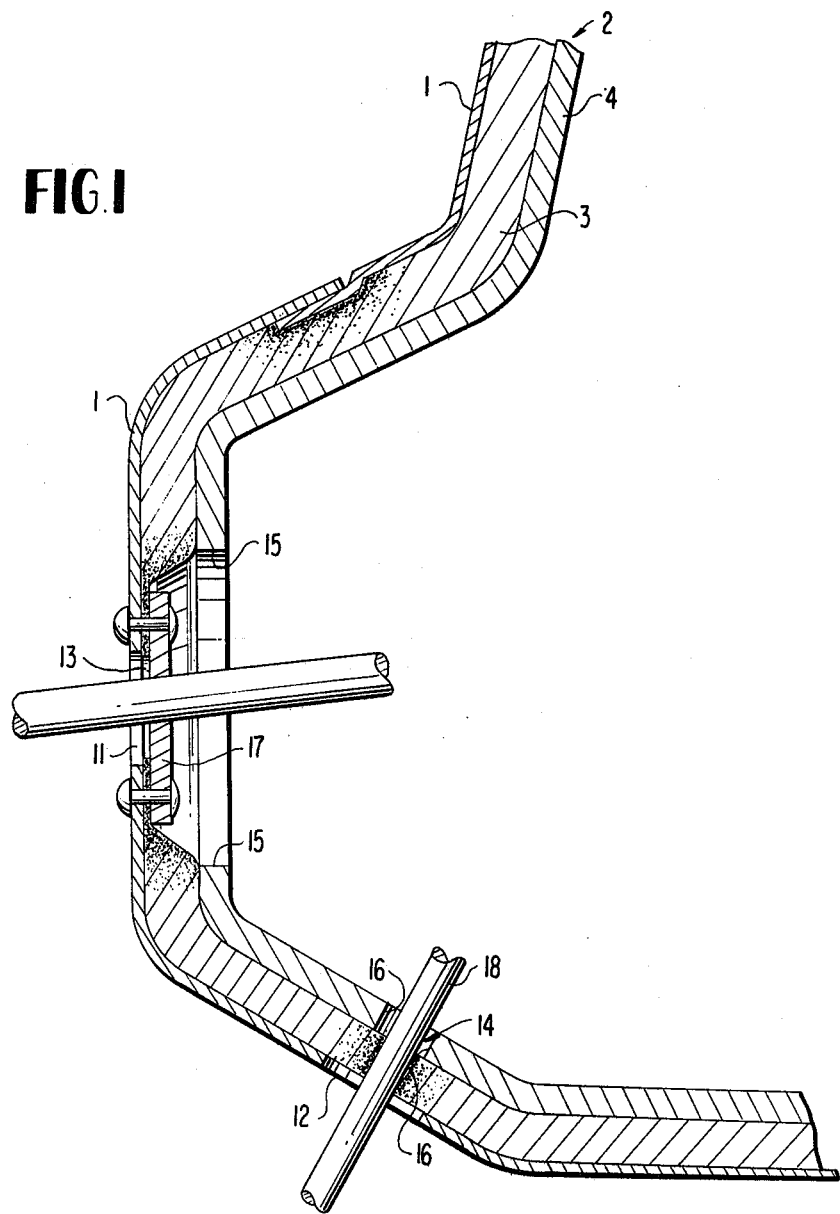

United States Patent [19]
Maier

[11] 4,083,595
[45] Apr. 11, 1978

[54] MULTI-LAYER SOUND- AND VIBRATION-ABSORBING COVER PANELS FOR BODY PARTS AND METHOD FOR APPLYING SAME

[75] Inventor: Rolf Maier, Sindelfingen, Germany

[73] Assignee: Daimler-Benz Aktiengesellschaft, Germany

[21] Appl. No.: 694,929

[22] Filed: Jun. 11, 1976

[30] Foreign Application Priority Data

Jun. 12, 1975 Germany .............................. 2526325

[51] Int. Cl.² .............................................. B62D 29/00
[52] U.S. Cl. .................................................. 296/39 A
[58] Field of Search ................................ 296/39 A, 31

[56] References Cited

U.S. PATENT DOCUMENTS

| | | | |
|---|---|---|---|
| 2,090,459 | 8/1937 | Paton | 296/39 A |
| 2,110,492 | 3/1938 | Upson | 296/39 A |
| 2,116,771 | 5/1938 | Seaman | 296/39 A |
| 2,180,305 | 11/1939 | Groskopf | 296/39 A |

*Primary Examiner*—Philip Goodman
*Attorney, Agent, or Firm*—Craig & Antonelli

[57] ABSTRACT

A multi-layer sound- and vibration-absorbing covering for vehicle body parts which consists of a layer of a springy porous material fixed to the body which is covered off by an adherent heavy coating; the porous layer receives a viscous damping mass which wets at least the walls of the pores of the porous material.

17 Claims, 2 Drawing Figures

U.S. Patent      April 11, 1978      4,083,595

MULTI-LAYER SOUND- AND VIBRATION-ABSORBING COVER PANELS FOR BODY PARTS AND METHOD FOR APPLYING SAME

The present invention relates to a multi-layer sound- and vibration-absorbing covering for body parts, consisting of a layer fixedly attached to the body of a springy or elastic, porous material which is covered off by an adherent heavy coating.

As already described in the German Offenlegungsschrift No. 1,163,040, such a covering represents a vibratory structure, which consists in effect of two masses and of one spring. The coordinated body part thereby acts as one mass while the second mass is formed by the heavy coating which covers off the porous, intermediate layer operating as spring. A disadvantage of this arrangement resides in the fact that the damping remains limited to a narrow frequency range or that for an effective damping a special damping coating (layer or film) has to be additionally applied on the coordinated body part.

It is therefore the aim of the present invention to so influence a covering of the aforementioned type in its vibrational effect by the use of slight expenditures that with an acceptable weight increase a wide frequency range can be covered in a sound- and vibration-absorbing manner.

Consequently, a multi-layer sound- and vibration-absorbing covering for body parts is proposed which consists of a layer fixed to the body and made of a springy or elastic, porous material which itself is covered off by an adherent heavy coating, whereby according to the present invention the porous layer receives or absorbs a dampingly effective, viscous mass which wets at least the walls of the pores. As a result thereof, the porous layer acting as spring is dampened which in turn leads again to a damping of the vibrator or resonator in the sense of an undroning.

In one preferred embodiment of the present invention, the viscous mass contains a component of a sticky or adhesive substance of any suitable known type, such as, for example, of bitumen, or consists only of such a substance which melts onto the body parts by heating action. This operation can take place in a known manner in the course of a paint treatment in an oven or heat chamber.

An escape of viscous mass is prevented during the storage if the viscous mass is closed off by a homogeneous layer covering the porous layer—for example, by a layer of an adhesive substance of suitable known type—or if preferably the viscous mass is adjusted to a flow temperature that corresponds to the oven temperature.

It is of advantage if the porous layer is provided with apertures within areas of the body parts provided with openings, which apertures are smaller than the openings, and if the porous layer projects over the coordinated edges of the apertured heavy coating under formation of a seal for the assembly parts to be mounted thereon or for the lines to be extended therethrough.

A simple mounting of the covering even in body part areas that are accessible only with difficulty is made possible if the heavy coating is matched in its configuration to the shape of the body part to be dampened.

Accordingly, it is an object of the present invention to provide a multi-layer sound- and vibration-absorbing covering for body parts which avoids by simple means the aforementioned shortcomings and drawbacks encountered in the prior art.

Another object of the present invention resides in a multi-layer sound- and vibration-absorbing covering for body parts in which the effective damping is not limited to a narrow frequency range.

A further object of the present invention resides in a multi-layer sound- and vibration-absorbing covering for body parts in which a wide frequency range can be effectively covered in a sound- and vibration-absorbing manner with acceptable weight increase of the body.

Still another object of the present invention resides in a multi-layer sound- and vibration-absorbing covering for body parts of the type described above which is simple in construction, easy to install and involves relatively low expenditures.

Figure 2:
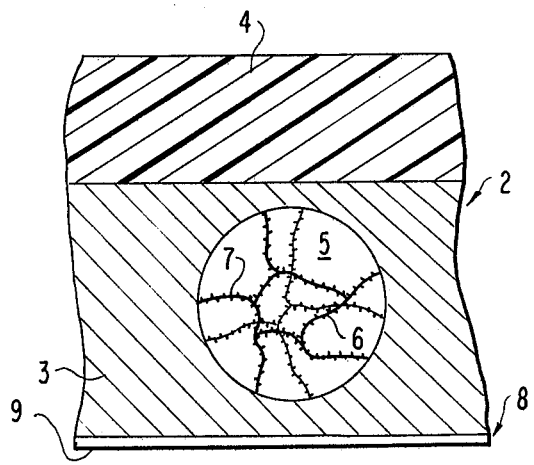

These and other objects, features and advantages of the present invention will become more apparent from the following description when taken in connection with the accompanying drawing which shows, for purposes of illustration only, one embodiment in accordance with the present invention, and wherein:

FIG. 1 is a partial cross-sectional view through a body part with an applied covering in accordance with the present invention; and FIG. 2 is a cross-sectional view through the structure of the covering, on an enlarged scale, as well as some particularly highlighted, enlarged pores.

Referring now to the drawing wherein like reference numerals are used throughout the two views to designate like parts, a body member 1 consisting of two parts is provided with a sound- and vibration-absorbing covering generally designated by reference numeral 2 which essentially consists of a porous layer 3 connected with the body member 1, which, in its turn, is covered off by an adherent heavy coating 4. The coating 4 which may have a decorative exposed surface has approximately the shape of the body member 1 to be dampened so that already with a point-wise fixing of the covering 2 prior to the subsequent heat treatment a good abutment takes place at the body member 1, which is additionally favored in that unevenesses and shape deviations of the body member 1 can be compensated for by the springy or elastic property of the porous layer 3. It is also possible to precompress the porous layer 3 so that unevenesses or irregularities are compensated by the expansion process during the heat treatment.

As is indicated in FIG. 2, the porous layer 3, for example, a layer of foamed material of any conventional type such as a synthetic resinous foamed material and having about 80% of open pores 5, is provided with a viscous mass 6 which—indicated by the points—wets at least the walls 7 of the pores 5. In special applications it may be appropriate depending on the type of the used mass 6, to fill the pores 5 more or less with this mass. If a sticky or adhesive substance such as, for example, bitumen is used as viscous mass 6, then it becomes unnecessary as a rule to cover the porous layer 3 in its area 8 facing the body by a homogeneous layer 9 (FIG. 2) as is recommended with the use of a non-sticky or non-adhesive mass 6. The layer 9 may in this case consist of adhesive material of any suitable type or the adhesive mass 6 may then serve as binding agent itself. However, it is appropriate to select in both cases a melting substance dry in the installed condition which is activated only by heat and thus permits a stacking of the covering 2.

In FIG. 1, the body member 1 is provided with openings 11 and 12 and the porous layer 3 is provided with apertures 13 and 14. The latter are smaller than the openings 11 and 12 whereas the porous layer 3 projects beyond the coordinated edges 15 and 16 of the also apertured coating 4 under formation of a seal for an assembly part 17 to be installed and for a line 18 to be extended therethrough. When lines or cables with slight diameter are extended through the porous layer 3, then the porous layer 3 merely has to be pierced or cut through so that a separate provision of apertures can be dispensed with. Since a complete sealing of the extended-through parts will establish itself especially during the heat treatment of the covering 2, cable funnels or spouts become superfluous.

In addition to bitumen, also other viscous materials such as, for example, synthetic oils or other liquids with high viscosity may be used in the present invention as viscous mass 6. Asphalt, pitch, waxes or plasticized synthetic resinous materials and mixtures thereof are typical examples of viscous materials usable with the present invention. The porous layer 3 may be made of any elastic, open-porous or partially open-porous-foamed materials, open-porous or partially open-porous-cellular materials or open-porous or partially open-porous-fiber materials such as, for example, polyurethane on a polyester basis or on a polyether basis, foamed polyethylene, foamed PVC, chloroprene, foamed synthetic plastic (resinous) materials, foam rubber, synthetic and textile fibers, etc. The porosity may be varied widely but is preferably between about 60% to about 80%. The coating 4 which forms in addition to the body wall the second mass of the vibratory structure consisting of the porous layer 3 and of two masses, may consist of suitable synthetic resinous materials, bitumen, cardboard, sheet metal, etc. The ratio of the adhesive substance to the porous layer depends on the damping properties of the used substances taking into consideration the fact that the porous layer should remain volumetrically elastic and compressible at every operating temperature of the application surface in the motor vehicle without the danger that the viscous mass will run out of the porous layer. If the viscous mass is not adhesive then it is necessary to apply a homogeneous layer 9 for purposes of connecting the sound and vibration absorbing covering with the body wall, which homogeneous layer may consist of a heat activatable adhesive layer or of a meltable bitumen or synthetic resinous layer which is adjusted in its melting point to the required melting temperatures. Additionally, also a layer which is directly adhesive may be, for example, sprayed-on or a contact adhesive material may be used.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. A Multi-layered sound- and vibration-damping coating for car body parts, consisting of a layer composed of a flexible porous material accepting a viscous mass, said layer being firmly attached to the car body, said material being covered by an adhesive heavy coating adapted to the shape of the car body part to be damped, characterized by the fact that an open-pored flexible foam layer is used as the porous material and the viscous mass contains at least a portion of adhesive substance, and further characterized by the fact that the foam layer is attached to the car body part to be damped by at least pointwise attachment, and attached more completely to the car body part by subsequent heat treatment with application of adhesive material.

2. Covering according to claim 1, characterized by the fact that the flexible layer is compressed when applied to the car body part to be damped and expanded only during heat treatment.

3. Coating according to claim 1, characterized by the fact that the viscous mass is covered by a homogeneous layer which covers the flexible layer.

4. Covering according to claim 1, characterized by the fact that the viscous mass which is applied has a flow temperature which corresponds to the oven temperature used in said heat treatment.

5. Covering according to claim 1, characterized by the fact that the flexible layer is provided with openings at areas in the car body which are provided with openings, said flexible layer openings being smaller than said car body openings, and by the fact that the foam layer projects above the corresponding edges of the perforated heavy coating forming a seal for assembly parts to be applied or lines to pass through.

6. A covering according to claim 1, characterized in that the viscous mass contains a proportion of an adhesive substance which melts onto the body parts by heat interaction.

7. A covering according to claim 6, characterized in that the substance is bitumen.

8. A covering according to claim 1, characterized in that the viscous mass essentially consists only of an adhesive substance which melts onto the body parts under heat interaction.

9. A covering according to claim 8, characterized in that the substance is bitumen.

10. A covering according to claim 1, characterized in that the viscous mass is closed off by a homogeneous layer covering the porous layer.

11. A covering according to claim 10, characterized in that the homogeneous layer essentially consists of an adhesive substance layer.

12. A covering according to claim 1, characterized in that the porous layer is provided with apertures in areas of the body parts provided with openings, said apertures being smaller than the openings, and in that the porous layer extends beyond the coordinated edges of the apertured heavy coating under formation of a seal for parts to be mounted thereon or to be extended therethrough.

13. A covering according to claim 1, characterized in that the viscous mass contains at least a certain proportion of an adhesive substance which melts onto the body parts by heat interaction.

14. A covering according to claim 13, characterized in that the porous layer is provided with apertures in areas of the body parts provided with openings, said apertures being smaller than the openings, and in that the porous layer extends beyond the coordinated edges of the apertured heavy coating under formation of a seal for parts to be mounted thereon or to be extended therethrough.

15. A method for applying a multi-layered sound- and vibration-damping coating to car body parts comprising the steps of:

applying an open pored flexible foam layer to a car body part to be damped by at least point-wise attachment so that the layer conforms generally to the shape of the body part to which it is attached, subsequently heat treating said open pored flexible foam layer, and covering said foam layer with an adhesive heavy coating having approximately the shape of the body part during said subsequent heat treatment step so as to provide a continuous sound and vibration dampening coating upon said body part.

16. A method according to claim 15, wherein said flexible foam layer applied to said body part is precompressed such that irregularities are compensated for by expansion thereof during said heat treatment step.

17. A method according to claim 15, wherein the adhesive coating used in said covering step is bitumen.

* * * * *